Patented June 24, 1947

2,422,889

UNITED STATES PATENT OFFICE 2,422,889

PYRIMIDINE COMPOUNDS AND PROCESS FOR MAKING THE SAME

Francis Henry Swinden Curd and Francis Leslie Rose, Blackley, Manchester, England, assignors to Imperial Chemical Industries Limited, a corporation of Great Britain No Drawing. Application September 25, 1944, Serial No. 555,752. In Great Britain September 29, 1943

9 Claims. (Cl. 260—251)

This invention relates to new pyrimidine compounds and to processes for making the same. The said new compounds, which will be more closely defined hereinafter, may be described broadly as pyrimidines bearing in the 2-position an arylguanidino group free from acidic substituents and in the 4-position a halogen atom and optionally bearing hydrocarbon substituents in the 5- and 6-positions. They are useful as intermediates in the manufacture of chemotherapeutic agents and particularly of the antimalarial agents of our copending application Ser. No. 555,750, It is an object of this invention to provide new pyrimidine compounds. A further object is to provide processes for making the same. A further object is to provide new intermediates for chemotherapeutic agents and processes for making the same. Further objects will appear hereinafter as the description proceeds. These and other objects are achieved by the following invention.

The said new compounds are 2-arylguanidino-4-halogeno-pyrimidines, wherein either or both of the 5- and 6-positions may be unsubstituted or may be occupied by a hydrocarbon radical or the 5- and 6-positions jointly may be occupied by a single divalent aliphatic hydrocarbon radical which forms with the 5- and 6-carbon atoms an alicyclic ring, and wherein the aryl radical of the 2-arylguanidino group is unsubstituted or substituted by one or more simple non-acidic substituents such, for example, as hydrocarbon radicals (which themselves may optionally bear simple substituents and which may be attached to the aryl radical directly or through an oxygen or sulphur atom or through an imino, sulphonyl or carbonyl group), halogen atoms or cyano, nitro, amino, acylamino, groups. Accordingly, the new compounds of this invention may be represented by the general formula

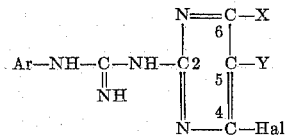

wherein Hal is a halogen atom, Ar represents a substituted or unsubstituted aryl radical of the benzene or naphthalene series which is, however, devoid of acidic substituents, while the pair of symbols X and Y represent substituents selected from the following group, namely: (a) a single divalent aliphatic hydrocarbon radical which forms with the 5- and 6-carbon atoms an alicyclic ring, (b) two hydrocarbon radicals, (c) one hydrocarbon radical and one hydrogen atom, and (d) two hydrogen atoms.

We make the said new compounds by a process comprising the interaction of the corresponding 2-arylguanidino-4-hydroxypyrimidine optionally substituted, in the manner indicated, in the 5- and/or 6-positions, with a halogenating agent, namely the pentachloride, pentabromide, oxychloride or oxybromide of phosphorus or a mixture of such agents, for example, a mixture of phosphorus pentachloride and phosphorus oxychloride.

The reaction is conveniently brought about by heating the reagents together, optionally in presence of a solvent or diluent. When phosphorus oxychloride is used as the halogenating agent, an excess thereof forms a very convenient reaction medium. Alternatively, an organic solvent, preferably boiling at or above 130° C., for example monochlorobenzene, may be used.

The 4-hydroxypyrimidine derivatives used as starting materials are conveniently made by the interaction of an arylbiguanide free from acidic substituents with an appropriate formylacetic ester, as is described in our copending application Ser. No. 555,751. An alternative process is described in our copending application Ser. No. 572,247.

As suitable hydroxypyrimidine derivatives there may be mentioned, for example, the following:

2-phenyl-4-hydroxy-6-methylpyrimidine,
2-p-chlorophenylguanidino-4-hydroxy- 6 - methylpyrimidine,
2-o-chlorophenylguanidino-4-hydroxy-6-methylpyrimidine,
2-m-chlorophenylguanidino-4-hydroxy-6 - methylpyrimidine,
2-o-methylphenylguanidino-4-hydroxy- 6 -methylpyrimidine,
2-m-methylphenylguanidino-4-hydroxy-6-methylpyrimidine,
2-p-methylphenylguanidino-4-hydroxy- 6 -methylpyrimidine,
2 - o - methoxyphenylguanidino - 4 - hydroxy - 6-methylpyrimidine,
2- p - methoxyphenylguanidino - 4 - hydroxy - 6 - methylpyrimidine,
2-p-chlorophenylguanidino-4-hydroxy-6-phenylpyrimidine,
2-p-bromophenylguanidino-4-hydroxy-6-methylpyrimidine, 2-p-bromophenylguanidino-4-hydroxy-6-ethylpyrimidine,
2-p-chlorophenylguanidino-4-hydroxy-6-ethylpyrimidine,
2-p-bromophenylguanidino-4-hydroxy-6-phenylpyrimidine,
2-p-methylmercaptophenylguanidino-4-hydroxy-6-methylpyrimidine,
2-(2':4'-dichlorophenylguanidino)-4-hydroxy-6-methylpyrimidine,
2-(2':5'-dichlorophenylguanidino)-4-hydroxy-6-methylpyrimidine,
2-(3':4'-dichlorophenylguanidino)-4-hydroxy-6-methylpyrimidine,
2-(3':5'-dichlorophenylguanidino)-4-hydroxy-6-methylpyrimidine,
2-(3':5'-dibromophenylguanidino)-4-hydroxy-6-methylpyrimidine,
2-(2'-methyl-4'-chlorophenylguanidino)-4-hydroxy-6-methylpyrimidine,
2-(3'-chloro-4'-methylphenylguanidino)-4-hydroxy-6-methylpyrimidine,
2-(3':4'-dimethylphenylguanidino)-4-hydroxy-6-methylpyrimidine,
2-(3':5'-dimethylphenylguanidino)-4-hydroxy-6-methylpyrimidine,
2-(2'-naphthylguanidino)-4-hydroxy-6-methylpyrimidine,
2-(6'-bromo-2'-naphthylguanidino)-4-hydroxy-6-methylpyrimidine,
2-(6'-methoxy-2'-naphthylguanidino)-4-hydroxy-6-methylpyrimidine,
2-(1'-naphthylguanidino)-4-hydroxy-6-methylpyrimidine,
2-(4'-chloro-1'-naphthylguanidino)-4-hydroxy-6-methylpyrimidine,
2-p-methoxyphenylguanidino-4-hydroxy-5-phenylpyrimidine,
2-p-ethoxyphenylguanidino-4-hydroxy-6-methylpyrimidine,
2-p-n-butylphenylguanidino-4-hydroxy-6-methylpyrimidine,
2-p-phenyl-phenylguanidino-4-hydroxy-6-methylpyrimidine,
2-p-nitrophenylguanidino-4-hydroxy-6-methylpyrimidine,
2-p-carbomethoxyphenylguanidino-4-hydroxy-6-methylpyrimidine,
2-p-cyanophenylguanidino-4-hydroxy-6-methylpyrimidine,
2-p-chlorophenylguanidino-4-hydroxy-5-phenylpyrimidine,
2-p-chlorophenylguanidino-4-hydroxy-5-methylpyrimidine,
2-p-chlorophenylguanidino-4-hydroxy-5:6-dimethylpyrimidine,
2-p-chlorophenylguanidino-4-hydroxy-5-ethyl-6-methylpyrimidine,
2-p-chlorophenylguanidino-4-hydroxypyrimidine,
2-p-methylphenylguanidino-4-hydroxypyrimidine,
2-p-chlorophenylguanidino-4-hydroxy-5:6:7:8-tetrahydroquinazoline,
2-p-chlorophenylguanidino-4-hydroxy-5:6-trimethylenepyrimidine,
2-p-dimethylaminophenylguanidino-4-hydroxy-6-methylpyrimidine,
2-p-methylsulphonylphenylguanidino-4-hydroxy-6-methylpyrimidine,
2-p-dimethylaminosulphonylphenylguanidino-4-hydroxy-6-methylpyrimidine,
2-p-iodophenylguanidino-4-hydroxy-6-methylpyrimidine,
2-p-fluorophenylguanidino-5-hydroxy-6-methylpyrimidine,
2-p-acetylaminophenylguanidino-4-hydroxy-6-methylpyrimidine,
2-(3'-chloro-5'-methoxyphenylguanidino)-4-hydroxy-6-methylpyrimidine,
2-p-chlorophenylguanidino-4-hydroxy-5-benzyl-6-methylpyrimidine.

The following examples illustrate, but do not limit, the invention. The parts are by weight.

*Example 1*

32.2 parts of 2-p-bromophenylguanidino-4-hydroxy-6-methylpyrimidine and 80 parts of phosphorus oxychloride are heated together under reflux for 30 minutes. After distilling off the excess of phosphorus oxychloride in vacuo at 50–60°, the residue is added to ice and water. The solid which is precipitated is collected and crystallised from hot water. There are thus obtained colourless crystals of 2-p-bromophenylguanidino-4-chloro-6-methylpyrimidine hydrochloride.

*Example 2*

30.8 parts of 2-(3'-chloro-5'-methoxyphenylguanidino)-4-hydroxy-6-methylpyrimidine and 100 parts of phosphorus oxychloride are heated together at 100° C. for 1 hour. The viscous solution so obtained is cautiously added to a mixture of 400 parts of 32 per cent caustic soda or 500 parts of concentrated aqueous ammonia (sp. gr. 0.88, and 1500 parts of crushed ice. The solid which precipitates is filtered off and dried in vacuo over caustic potash. The dry crude 2-(3'-chloro-5'-methoxyphenylguanidino)-4-chloro-6-methylpyrimidine is recrystallised from methanol and then metals at 166°–168° C.

*Example 3*

27.9 parts of 2-p-chlorophenylguanidino-4-hydroxy-6-methylpyrimidine, 15.6 parts of phosphorus oxychloride and 100 parts of chlorobenzene are heated together at 100°–105° C. for 1 hour. The reaction mixture is cooled somewhat and added to 2000 parts of caustic soda of 10 per cent strength. The chlorobenzene is then distilled off in steam. The crude solid 2-p-chlorophenylguanidino-4-chloro-6-methylpyrimidine which remains is collected and dried at 50° C. It may be recrystallised from β-ethoxyethanol and then forms colourless needles which melt at 186–187° C.

For convenience the following examples are given in abbreviated form. Examples 4–13 are carried out by the method described in Example 1, and Examples 14–31 by the method described in Example 2. The data given are (i) the 2-arylguanidino-4-hydroxypyrimidine used as starting material, (ii) the number of parts and (iii) the 2-arylguanidino-4-halogenopyrimidine formed therefrom. Many of these halogeno compounds can only be recrystallised from solvents which boil at or above the decomposition temperature and for this reason it is not in every case possible to characterise the reaction product by melting point. The crude reaction products are in most instances substantially pure, the contaminant being usually the corresponding hydroxypyrimidine, present either as unchanged starting material or as the result of partial hydrolysis of the halogeno compound.

*Example 4*

2-p-cyanophenylguanidino-4-hydroxy-6-methylpyrimidine, 26.9 parts; 2-p-cyanophenylguanidino-4-chloro-6-methylpyrimidine hydrochloride.

Example 5

2-p-iodophenylguanidino - 4 -hydroxy-6-methylpyrimidine, 37.0 parts; 2-p-iodophenylguanidino - 4 -chloro-6-methylpyrimidine hydrochloride.

Example 6

2 - phenylguanidino-4-hydroxy - 6 - methylpyrimidine, 24.3 parts; 2-phenylguanidino-4-chloro-6-methyl-pyrimidine hydrochloride.

Example 7

2-p-anisylguanidino-4-hydroxy - 6 - methylpyrimidine, 27.4 parts; 2-p-anisylguanidino-4-chloro-6-methylpyrimidine hydrochloride.

Example 8

2 - m - chlorophenylguanidino - 4 - hydroxy-6-methylpyrimidine, 27.9 parts; 2-m-chlorophenylguanidino-4-chloro - 6-methylpyrimidine hydrochloride.

Example 9

2-m-tolylguanidino- 4 - hydroxy - 6- methylpyrimidine, 25.8 parts; 2-m-tolylguanidino-4-chloro-6-methylpyrimidine hydrochloride.

Example 10

2-β-naphthylguanidino-4-hydroxy- 6 - methylpyrimidine, 29.4 parts; 2-β-naphthylguanidino-4-chloro-6-methylpyrimidine hydrochloride.

Example 11

2 - (3':4' - dimethylphenylguanidino) - 4 - hydroxy-6-methylpyrimidine, 27.2 parts; 2-(3':4'-dimethylphenylguanidino)-4-chloro - 6 - methylpyrimidine hydrochloride.

Example 12

2-o-tolylguanidino-4-hydroxy-6- methylpyrimidine, 25.8 parts; 2-o-tolylguanidino-4-chloro-6-methylpyrimidine hydrochloride.

Example 13

2 - o - chlorophenylguanidino - 4 - hydroxy - 6 - methylpyrimidine, 27.9 parts; 2-o-chlorophenylguanidino-4-chloro-6-methylpyrimidine hydrochloride.

Example 14

2-p-nitrophenylguanidino-4-hydroxy-6 - methylpyrimidine, 28.9 parts; 2-p-nitrophenylguanidino-4-chloro-6-methylpyrimidine, M. P. 204°–205° C.

Example 15

2-p - methylmercaptophenylguanidino - 4 - hydroxy-6-methylpyrimidine, 29.0 parts; 2-p-methylmercaptophenylguanidino-4-chloro-6 - methylpyrimidine, M. P. 170–172° C.

Example 16

2-p-phenyl - phenylguanidino - 4 - hydroxy - 6-methylpyrimidine, 32.0 parts; 2-p-phenyl-phenylguanidino-4-chloro-6-methylpyrimidine.

Example 17

2-p-tolylguanidino-4-hydroxy-6-methylpyrimidine, 25.8 parts; 2-p-tolylguanidino-4-chloro-6-methylpyrimidine, M. P. 157–162° C.

Example 18

2-p- methylsulphonylphenylguanidino - 4 - hydroxy-6-methylpyrimidine, 32.2 parts; 2-p-methylsulphonylphenylguanidino-4-chloro-6 - methylpyrimidine, M. P. 180° C.

Example 19

2 - p - dimethylaminophenylguanidino - 4 - hydroxy - 6 - methylpyrimidine, 28.7 parts; 2-p-dimethylaminophenylguanidino-4-chloro-6 - methylpyrimidine, M. P. 198° C.

Example 20

2-p-dimethylaminosulphonylguanidino -4- hydroxy-6-methylpyrimidine, 35.1 parts; 2-p-dimethylamino - sulphonylphenylguanidino - 4 - chloro-6-methylpyrimidine, M. P. 182° C.

Example 21

2-(2' - methyl-4'-chlorophenylguanidino)-4-hydroxy-6-methylpyrimidine, 29.3 parts; 2-(2'-methyl -4'- chlorophenylguanidino)-4-chloro-6-methylpyrimidine, M. P. 166–168° C.

Example 22

2-(2':5'-dichlorophenylguanidino)-4-hydroxy-6 - methylpyrimidine, 31.3 parts; 2-(2':5' - dichlorophenylguanidino) -4- chloro -6- methylpyrimidine, M. P. 172–174° C.

Example 23

2-(3':5'-dichlorophenylguanidino)-4-hydroxy-6-methylpyrimidine, 31.3 parts; 2-(3':5'-dichlorophenylguanidino) -4-chloro-6- methylpyrimidine.

Example 24

2 - p - fluorophenylguanidino -4- hydroxy-6-methylpyrimidine, 26.2 parts; 2-p-fluorophenylguanidino-4-chloro -6- methylpyrimidine, M. P. 195° C.

Example 25

2-(3':4':5' - trichlorophenylguanidino)-4-hydroxy - 6 - methylpyrimidine, 34.8 parts; 2-(3':4':5'-trichlorophenylguanidino) -4- chloro-6-methylpyrimidine.

Example 26

2-p-chlorophenylguanidino -4- hydroxypyrimidine, 26.5 parts; 2-p-chlorophenylguanidino-4-chloropyrimidine.

Example 27

2-p-chlorophenylguanidino -4- hydroxy-5:6-dimethylpyrimidine, 29.3 parts; 2 - p - chlorophenylguanidino-4-chloro -5:6- dimethylpyrimidine, M. P. 192–193° C.

Example 28

2 -p- chlorophenylguanidine -4- hydroxy-5-ethyl - 6 - methylpyrimidine, 30.7 parts; 2-p-chlorophenylguanidino-4-chloro-5-ethyl-6-methylpyrimidine, M. P. 195–196° C.

Example 29

2 -p- chlorophenylguanidino -4- hydroxy-5-phenylpyrimidine, 35.6 parts; 2-p-chlorophenylguanidino-4-chloro-5-phenylpyrimidine.

Example 30

2 -p- chlorophenylguanidino -4- hydroxy-5:6-trimethylene pyrimidine, 32.0 parts; 2-p-chlorophenylguanidino -4- chloro -5:6- trimethylene pyrimidine, M. P. 162–165° C.

Example 31

2 - p - chlorophenylguanidino - 4 - hydroxy-5:6:7:8-tetrahydroquinazoline, 33.4 parts; 2-p-chlorophenylguanidino-4-chloro-5:6:7:8 - tetrahydroquinazoline, M. P. 173–175° C.

The following example is taken from our copending application, Serial No. 555,751, and illustrates the mode of preparation of the initial material for Example 1 above:

*Procedure A.*—29.25 parts of p-bromophenylbiguanide hydrochloride (conveniently made by refluxing an aqueous solution of equimolecular proportions of p-bromoaniline hydrochloride and dicyanodiamide) and 14 parts of a 32 per cent aqueous solution of caustic soda are stirred together in 90 parts of ethyl alcohol at 20° C. After 15 minutes 13 parts of ethyl aceto-acetate are added and the mixture is allowed to stand for 48 hours. The crystalline precipitate which forms is filtered off, washed with ethyl alcohol, then with water to dissolve out any sodium chloride, and finally dried at 100° C. It is 2-p-bromophenylguanidino -4- hydroxy -6- methylpyrimidine of M. P. 252–254° C. (uncorr.).

In a similar manner, the initial 4-hydroxypyrimidines for the other examples hereinabove set forth may be prepared. Thus, to prepare the initial material for Example 3 hereinabove, the 29.25 parts of p-bromophenylbiguanide hydrochloride are replaced by 24.8 parts of p-chlorophenylbiguanide hydrochloride.

The following additional example illustrates an alternative procedure and is taken from our copending application Serial No. 572,247, which was filed subsequently to this application but has an effective U. S. filing date under R. S. 4887 as of August 3, 1944:

*Procedure B.*—A mixture of 17.6 parts of 2-cyanimino-4-hydroxy -5:6- trimethylenepyrimidine, 12.8 parts of p-chloroaniline, 16.4 parts of p-chloroaniline hydrochloride, 80 parts of β-ethoxyethanol and 24 parts of water is heated under reflux for 3 hours. The resultant solution is diluted with 400 parts of cold water, whereupon a precipitate is formed, which is filtered off and washed with water. The crude 2-p-chlorophenylguanidino-4-hydroxy-5:6-trimethylene - pyrimidine so obtained is dissolved in 120 parts of hot methyl alcohol with the aid of an excess of concentrated hydrochloric acid and the solution of the hydrochloride so obtained is filtered to remove any insoluble impurities. The filtrate is then made alkaline with ammonia and diluted with water, and the base which is precipitated is filtered off and recrystallised from β-ethoxyethanol. It then forms colourless needles which melt at 257°–258° C.

The reaction product in this example will be recognized as the initial material employed by us in Example 30 hereinabove. If the specified quantity of 2-cyanimino-4-hydroxy-5:6-trimethylene-pyrimidine in the above procedure is replaced by 19.0 parts of 2-cyanimino-4-hydroxy-5:6:7:8-tetrahydroquinazoline (M. P. 278° C.), the initial material for Example 31 hereinabove is obtained.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

In the claims below, the expression "acidic substituents" refers to radicals commonly recognized as ionizable, salt-forming, acid radicals, and typified by the carboxy, sulfonic acid, and phenolic OH radicals. The term "aryl" is to be construed in a generic sense including aromatic hydrocarbon radicals and their substitution derivatives excepting, of course, such as may be explicitly excluded by the language of the claims.

We claim:

1. As new compounds, 4-halogenopyrimidines bearing in the 2-position an arylguanidino group devoid of acidic substituents.

2. As new compounds, the pyrimidine derivatives of the formula

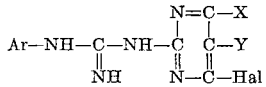

wherein Hal is a halogen atom, Ar is an aromatic radical which contains not more than 10 carbon atoms in its cyclic skeleton and which is devoid of acidic substituents, while the pair of symbols X and Y represent substituents selected from the following group, namely: (a) a single divalent aliphatic hydrocarbon radical which forms with the 5- and 6-carbon atoms an alicyclic ring, (b) two hydrocarbon radicals, (c) one hydrocarbon radical and one hydrogen atom, and (d) two hydrogen atoms.

3. As new compounds, 2-arylguanidino-4-halogeno-6-methylpyrimidines wherein the aryl radical is an aromatic radical which contains not more than 10 carbon atoms in its cyclic skeleton and is devoid of acidic substituents.

4. As new compounds, 2-arylguanidino-4-halogeno-5:6-dialkylpyrimidines wherein the aryl radical is an aromatic radical which contains not more than 10 carbon atoms in its cyclic skeleton and is devoid of acidic substituents.

5. As new compounds, 4-halogeno-6-methylpyrimidines bearing in the 2-position a p-substituted phenylguanidino group devoid of acidic substituents.

6. As new compounds, 4-halogeno-6-methylpyrimidines bearing in the 2-position a naphthylguanidino group devoid of acidic substituents.

7. As a new compound, 4-chloro-6-methyl-2-(4' - chlorophenylguanidino) - pyrimidine, said compound having a probable structure corresponding to the following formula:

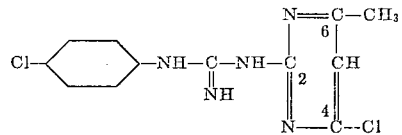

8. Process for the manufacture of 4-halogenopyrimidines bearing in the 2-position an arylguanidino group devoid of acidic substituents, which comprises the interaction of the corresponding 2-arylguanidino-4-hydroxypyrimidines with a halogenating agent selected from the group consisting of the pentachloride, pentabromide, oxychloride and oxybromide of phosphorus and mixtures of such agents.

9. Process for the manufacture of 2-arylguanidino-4-halogeno - 6 - methylpyrimidines whereof the aryl radical is an aromatic radical which contains not more than 10 carbon atoms in its cyclic skeleton and is devoid of acidic substituents, which comprises the interaction of the corresponding 2-arylguanidino-4-hydroxy- 6 - methylpyrimidine with a halogenating agent, selected from the group consisting of the pentachloride, pentabromide, oxychloride and oxybromide of phosphorus and mixtures of such agents.

FRANCIS HENRY SWINDEN CURD.
FRANCIS LESLIE ROSE.

Certificate of Correction

Patent No. 2,422,889. June 24, 1947.

FRANCIS HENRY SWINDEN CURD ET AL.

It is hereby certified that errors appear in the printed specification of the above numbered patent requiring correction as follows: Column 1, line 39, after the word "acylamino" insert *alkoxy or carboalkoxy*; column 2, line 35, for "2-phenyl-4-" read *2-phenylguanidino-4-*; column 4, line 35, Example 2, for "metals" read *melts*; column 6, line 53, Example 28, for "chlorophenylguanidine" read *chlorophenylguanidino*; and that the said Letters Patent should be read with these corrections therein that the same may conform to the record of the case in the Patent Office.

Signed and sealed this 26th day of August, A. D. 1947.

[SEAL]

LESLIE FRAZER,
*First Assistant Commissioner of Patents.*